May 14, 1968     D. K. SWICK ET AL     3,382,561
PROCESS FOR BRAZING CAST IRON STRUCTURES
Filed April 21, 1965
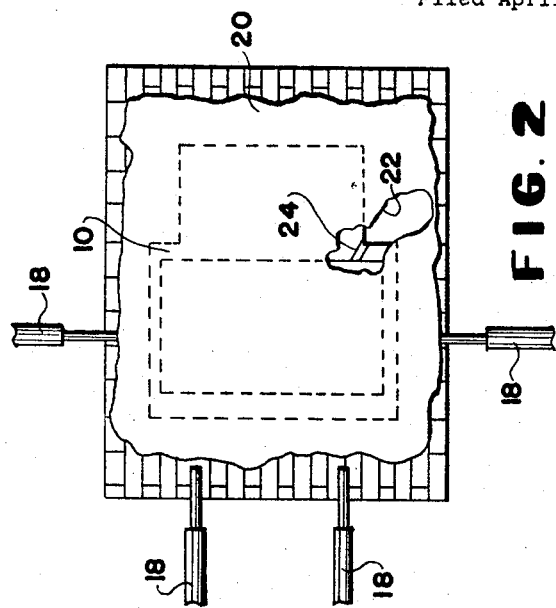
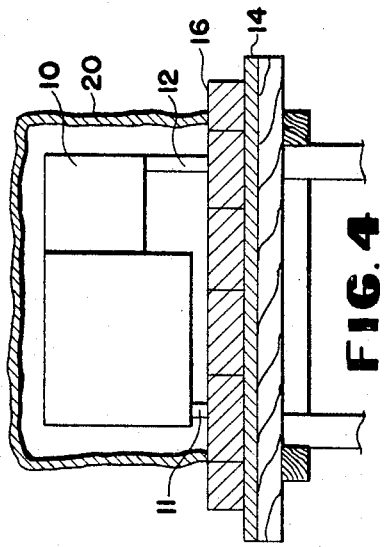
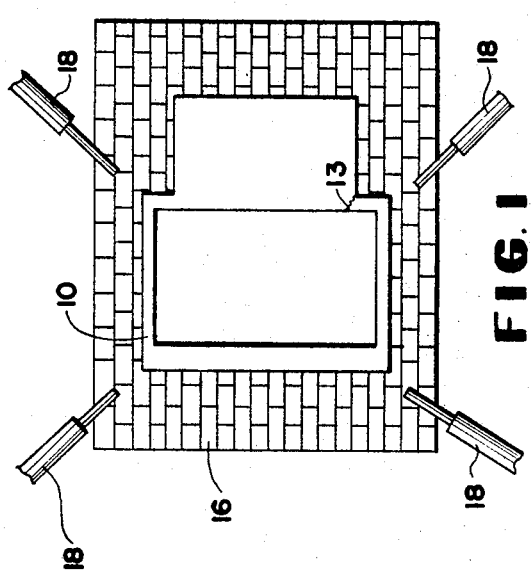
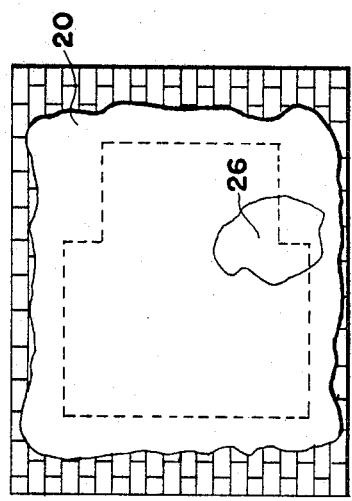
INVENTOR.
DWAIN K. SWICK
CLARENCE E. SWICK
BY
*John H. Widdowson*
ATTORNEY

United States Patent Office 3,382,561
Patented May 14, 1968

3,382,561
PROCESS FOR BRAZING CAST
IRON STRUCTURES
Dwain K. Swick and Clarence E. Swick, both of 400 N.
Chestnut, McPherson, Kans. 67460
Filed Apr. 21, 1965, Ser. No. 449,834
2 Claims. (Cl. 29—402)

ABSTRACT OF THE DISCLOSURE

This invention relates to the repair of cast iron structures, more specifically to a process of building up and repairing cast iron structures by brazing. More specifically, this invention relates to the process for the repair of cast iron structures through locating a fracture in the structure; enlarging the fracture to a groove; preheating the entire structure within a predetermined temperature range by the application of heat to various areas of the structure to achieve an overall, even heating thereof; filling in the groove by brazing the same; and enclosing the structure in insulating material and cooling at a predetermined rate so as to not have excessive stresses therein.

---

The repairing of cast iron structures, particularly relatively large complex cast iron structures such as engines, engine blocks, cylinder heads, cases, etc. presents many problems. Many attempts have been made to repair fractured cast iron structures and the like with welding techniques. However, in general welding techniques as employed by processes known to the prior art have not been satisfactory. Very frequently engine blocks, cylinder heads, etc. are merely discarded and replaced with new structures when a fracture occurs. Invariably the equipment, of which the fractured structure is a part of, is thereby rendered out of operation for a relatively long time while a new part is ordered or fabricated. This down time is particularly serious in a factory, machine shop, plant, etc. where a large number of employees are unable to work while the repair is being made, or where there is a deadline on the completion of a project. Under these circumstances repair of fractured cast iron structures is desirable provided that it can be satsfactorily accomplished, since such repairs can be quickly done and thereby normally reduce the down time of the equipment.

Metals in general have a relatively high thermal coefficient of expansion. When a metal structure is unevenly heated, the hotter portions expand more than do the relatively cooler portions, consequently setting up internal stresses within the structure. When a cast iron structure is welded, by conventional methods, the area of the weld is normally much hotter than the surrounding areas. After the portions of the structure are fused by the weld, they are relatively immovable. When the cast iron structure then cools to a uniform temperature, various portions which were heated to varying temperatures contract in varying amounts. Internal stresses are then set up which are very serious in cast iron structures, since the metal is relatively brittle and lacks the ductility to adjust. Very often the fracture will break upon cooling, or will be so weakened by the internal stresses that it will be unserviceable. In addition, cast iron will grow or expand upon heating due to crystal growth. This factor further complicates the situation with respect to internal stresses produced by welding, since ordinarily the growth is related to the heat applied and is not therefore uniform throughout the structure.

In some processes known to the prior art for the repair of cast iron structures, an effort is made to avoid heating the area of the repair to high temperatures. One such process is known as "studding." In this repair process, holes are tapped and drilled in the casting on each side of the fracture and studs screwed into the holes. A thin mild steel weld is then deposited on the surface of the structure overlying the fracture and in engagement with the studs. This structure in general corresponds to a butt strap joint in a riveted splice. The basis of the design for such a repair is similar to the basis of a design for a riveted splice. However, since the weld metal often breaks away from the casting during cooling, these joints are seldom reliable for tightness against fluids or gases.

Another analogous type of repair of cast iron structures known to the prior art involves drilling or otherwise forming an elongated recess transverse to the fracture on either side of the fracture in the casting, and then snugly fitting an insert therein to bridge the fracture. In order to seal the crack itself, a strip of ductile metal is then driven into the crack and peened. This method of repair is generally unsatisfactory if the structure is exposed to high temperatures or pressure since the ductile metal seal will frequently fail. This type of repair is in general unsatisfactory for the repair of engines, engine blocks, cylinder heads, etc.

It is common repair practice in the art when a cast iron structure is fractured that is intended to be used in a severe environment to weld the fracture and then subsequently thermally relieve the stresses caused by the welding. The normal practice in stress relieving welded cast iron structures is to apply the post heat immediately upon completion of the weld, raising the temperature at a rate which permits uniform heat absorption over the entire mass of the structure to a temperature in the range of from 1100 to 1150 degrees F., and holding the weldment at that temperature for not less than one hour per inch of thickness. The structure is then cooled in a stress relieving furnace. This method of welding and subsequently stress relieving cast iron structures, has not been entirely satisfactory. During the weld, the structure is heated in the area of the weld to a temperature sufficiently high to cause melting of the base metal, usually having a melting point in the range of 2400 to 3000 degrees F. The post heat does not appear to completely relieve the internal stresses and frequently leaves the casting in a weakened condition. Further, a great deal of troublesome warping in the structure is encountered. The warping is very serious in the case of engine blocks, and the like, since bearing mounts become misaligned, abutting surfaces, such as a surface on a block that abutts the cylinder head, becomes twisted etc. This warping renders the structure unserviceable since warping distortion cannot be satisfactorily corrected.

The repairing of fractures, etc. in cast iron structures by brazing is also known in the art. The advantage of brazing, as compared to conventional welding techniques, is that the melting point of the non-ferrous metals used in brazing is several degrees below that of cast iron. Therefore, the braze or repair can be done with a lower heat input. In addition, the rate of deposition of the molten material is greater, permitting speedier completion of the work. By virtue of the low yield point of the non-ferrous metal, the development of internal stresses upon completion of the weld is less severe. However, the known methods and techniques of brazing have not been entirely satisfactory. While the fusing temperature is relatively low in comparison to conventional welding, the internal stresses produced in the casting are of sufficient magnitude to materially weaken it. The problem of warping also prevails.

We have invented a new method of brazing cast iron structures. In the new method of our invention, the structure to be repaired is pre-heated to a temperature in the range of 700 to 1150 degrees F. The fracture or other repair is then brazed with a non-ferrous metal rod. Subsequently the structure is slowly cooled to below 400 degrees F., preferably in a controlled environment.

The new process of brazing cast iron structures of our invention solves all of the problems prevalent in all brazing methods known to the prior art. When the new process of brazing of our invention is used, the internal stresses normally formed during the brazing operations performed in accordance with the techniques known to the prior art, are virtually eliminated. The finished repaired structure done in accordance with the process of the invention is strong and serviceable due to the virtual absence of internal stresses. Further, the problems of warping of the structure, very common in many welding techniques performed in accordance with the knowledge available to the prior art, are minimized in the process of our invention.

An object of this invention is to provide a new method of repairing cast iron structures.

Another object of this invention is to provide a new method of brazing cast iron structures.

Yet another object of this invention is to provide a new method of brazing cast iron which relieves the internal stresses in the structure being brazed.

Another object of this invention is to provide a new method of brazing relatively complex cast iron structures such as engine blocks, cylinder heads, gear cases, etc.

Another object of this invention is to provide a new method of brazing cast iron structures in which the tendency of the structure to warp is minimized.

Another object of this invention is to provide a new method of building up portions of cast iron structures which leaves the structure in strong serviceable condition.

Other objects and advantages of the new process of our invention will become apparent to those skilled in the art upon reading the disclosure.

Drawings and examples accompany and are a part of this disclosure. These drawings and examples depict and describe preferred specific embodiments of the new process of brazing of our invention, and it is to be understood that such drawings are not to unduly limit the scope of our invention. In the drawings, FIG. 1 is a top view illustrating a fractured casting positioned on a table preparatory to being brazed in accordance with the process of brazing cast iron structures of our invention.

FIG. 2 is a top view of a fractured cast iron structure shown enclosed in an insulating covering with burners positioned to maintain the temperature of the structure in accordance with the process of the invention.

FIG. 3 is a top view of the brazed casting structure showing the access opening in the insulation covering closed during the cooling stage of the process of the invention.

FIG. 4 is a side elevational view in cross section showing the repaired casting being cooled in the insulating enclosure.

The following is a discussion and description of the new brazing process of our invention made with reference to the drawings, wherein the same reference numerals are used to indicate the same or similar parts and/or structure. The discussion and description is of preferred specific embodiments of the new brazing process of our invention, and it is to be understood that such is not to unduly limit the scope of our invention.

Referring now to the drawings, FIGS. 1 through 4, there is illustrated the general sequence of method steps of the process for repairing fractured cast iron structures of our invention. As illustrated in FIG. 1 the cast iron structure 10 to be repaired, is firmly mounted on a table 14, preferably provided with a covering of firebrick 16 in order to protect same from the heat. Care must be taken to make certain that the structure 10 is firmly mounted and not subject to any deformation forces due to gravity, etc. Frequently the fracture in the structure 10 can be located by inspection. Support members 11 and 12 are employed on which the casting rests during the brazing operation, and such should be selected and used to prevent warping of the member being worked on. The fracture or crack 13 is first enlarged to a groove, preferably approximately one-half inch wide, by either grinding or chipping. If the fracture is enlarged by grinding, a special stone should be used which does not leave a rosin coating or other coating on the surface of the casting. Very frequently a grinding stone has a binding material made of rosin or other material which will leave a coating on the surface being ground. This coating should be avoided since the area to be brazed should be absolutely clean. The width of the groove will be determined in part by the thickness of the wall of the casting to be repaired. If the casting wall is relatively thick, a somewhat wider groove may be necessary. If the casting wall to be repaired is relatively thin, a somewhat narrower groove can be made.

After the crack, fracture, or area to be built up, such as in an engine block, has been enlarged, the entire structure 10 is pre-heated. The pre-heated temperature of the structure should be in the range of 500 to 1100 degrees F., more preferably in the range of 600 to 900 degrees F., most preferably in the range of 700 to 800 degrees F. Care should be taken that the structure is pre-heated as evenly as possible. It is desirable that a plurality of heating burners be used to pre-heat the structure. More heat should be applied to the thicker areas of the structure in order to pre-heat as evenly as possible. We have found that with a relatively large casting, such as a cylinder head, block, transmission casing, etc. four burners 18 can be manipulated by two persons, with each person holding a burner in each hand and playing them on the cast iron structure 10.

When the structure 10 has been pre-heated to the desired pre-heat temperature, the structure is enclosed. Desirably the enclosure can be a sheet of asbestos paper drapped or otherwise supported over the cast iron structure 10, as shown in FIG. 2. The burners or torches 18 are adjusted to a lower heat and maintained on the structure 10 in order to maintain the pre-heat temperature of the structure. Holes can be torn into the covering 20 in order to admit the heat from burners 18. In the area over the fracture a relatively large access hole 22 can be made as shown in FIG. 2. The groove 24 produced by enlarging the fracture is then filled by brazing it with a low fuming bronze rod. The brazing repair should be accomplished as rapidly as possible in order to avoid large applications of heat to the localized area.

When all of the areas to be repaired are brazed, the heat is removed from the enclosure and the furnace or enclosure completely closed with insulated material as shown in FIG. 3. The casting 10 is then allowed to slow cool in the enclosure or furnace to approximately 300 degrees F. before removal from the furnace or enclosure. As indicated in FIG. 3, the access aperture 22 can be closed with a patch 26 of asbestos. As shown in FIG. 4, it is desirable that the cast iron structure 10 be positioned with the area to be welded in an inclined position. This position allows the weld to progress from the bottom to the top and allows the impurities to float to the top where they can be subsequently removed after the weld is completed. When the structure has cooled sufficiently the various machining operations are performed in order to place the structure in serviceable condition.

The following example illustrates a preferred specific embodiment of the new brazing process of our invention.

*Example*

A D–8 Caterpillar transmission case which was cracked in several places was repaired. The transmission case is of cast iron and weighs approximately 3000 pounds. In such instances, where there is no great heat extremes applied in service to the area of the repair, brazing repair is quite satisfactory. The cracks or fractures in the transmission case were located by visual inspection. If the crack could not have been readily located by visual inspection, other methods of locating the fracture could have been resorted to, such as dye penetrants, magnetic particle inspection, etc. The cracks in the thickest part of the casting were chipped out with a chipping gun. The large cracks were then finished with a grinding wheel utilizing special stones that did not leave a residue on the surface. The small cracks in the case were simply ground out with special stones. All areas were then cleaned thoroughly before welding. The transmission case was then set up on a firebrick covered table. It was supported in three places so that distortion would not occur when it was subsequently heated. Two men then took two pre-heating burners each and applied heat to the casting, putting proportionally more heat to the thicker portions. In the pre-heating we found it desirable to move about the casting painting all the thicker sections with heat. The pre-heating operation took approximately 45 minutes at which time the casting reached a pre-heating temperature approximately 800 degrees F. It was then covered with asbestos paper forming a furnace about the casting. Holes were torn in the paper approximately 6 inches in diameter for the pre-heat burners to maintain the pre-heat temperature in the furnace. The pre-heat burners were then placed about the casting in such a way as to heat the casting as evenly as possible. The burners were kept on the casting until all repairs were completed. During the repair, the position of the burners was varied in order to best keep the temperature of the casting as uniform as possible. Casting was allowed to heat to approximately 900 degrees before the brazing was started. The cracks were then brazed following normal torch brazing techniques with a low fuming brazing rod. Where necessary, the case was turned or repositioned so that the fractures could be placed in a desirable position for brazing. When all the brazing repairs were made, the furnace was completely closed with asbestos paper and the casting allowed to slow cool at a rate of approximately 225 degrees F. per hour. When the casting cooled to a temperature of 300 degrees F., the furnace was torn down and the various machining and grinding operations performed to finish the repair.

As will be obvious to those skilled in the art, various changes and modifications of the preferred brazing method of our invention as described herein can be made or followed without departing from the spirit of the disclosure or the scope of the claims.

We claim:
1. A method of repairing a fractured cast iron engine block or the like comprising, (1) enlarging the fracture to a groove approximately one-half inch wide by grinding and chipping, (2) evenly pre-heating the entire block to a temperature in the range of 600 to 800 degrees F. by the selective application of heat to the thick and thin areas of the engine block to achieve an overall, even gradual increase in material temperature regardless of thickness, (3) enclosing the block in an insulating material (4) continuing pre-heating the enclosed block through openings in the insulating material to a temperature in the range of 750 to 950 degrees F., (5) maintaining the temperature of the block by continued application of heat at a slower rate, (6) filling in the groove by brazing same with a low fuming bronze rod, (7) discontinuing the application of heat, and (8) completely enclosing the block in insulating material and cooling the block to a temperature below 400 degrees F. at a rate in the range of from 150 to 350 degrees F. per hour.

2. A method of repairing a fractured cast iron structure comprising (1) enlarging the fracture, (2) enclosing the structure in an insulating material, (3) pre-heating the block to a temperature in the range of 750 to 950 degrees F. by the selective application of heat to areas of varying thickness of the engine block to achieve an overall, even heating thereof regardless of material thickness, (4) brazing the enlarged fracture with a low fuming bronze rod, (5) completely enclosing the block in the insulating material, and (6) cooling the block to a temperature below 400 degrees F. at a rate in the range of from 150 to 350 degrees F. per hour.

References Cited

UNITED STATES PATENTS

| | | | |
|---|---|---|---|
| 1,777,531 | 10/1930 | Peterson | 29—402 |
| 2,410,464 | 11/1946 | Scott | 29—402 |

OTHER REFERENCES

Davies, A. C.: The Science and Practice of Welding, Great Britain; Cambridge University Press, 1947, Revised Third Edition, copy in Group 320.

JOHN F. CAMPBELL, *Primary Examiner.*

D. C. REILEY, *Assistant Examiner.*